(12) United States Patent
Nibarger et al.

(10) Patent No.: US 8,922,955 B1
(45) Date of Patent: *Dec. 30, 2014

(54) CORROSION PROTECTION UTILIZING A MILLED, BOTTOM SPIN VALVE GMR SENSOR

(75) Inventors: John P. Nibarger, Superior, CO (US); Ricky L. Ewasko, Boulder, CO (US)

(73) Assignee: Oracle America, Inc., Redwood City, CA (US)

( * ) Notice: Subject to any disclaimer, the term of this patent is extended or adjusted under 35 U.S.C. 154(b) by 1063 days.

This patent is subject to a terminal disclaimer.

(21) Appl. No.: 11/447,622

(22) Filed: Jun. 6, 2006

(51) Int. Cl.
*G11B 5/127* (2006.01)

(52) U.S. Cl.
USPC ...................................................... 360/324.1

(58) Field of Classification Search
None
See application file for complete search history.

(56) References Cited

U.S. PATENT DOCUMENTS

| 2004/0052006 | A1* | 3/2004 | Odagawa et al. | 360/324.1 |
| 2005/0219766 | A1* | 10/2005 | Machita et al. | 360/324.1 |
| 2007/0242394 | A1* | 10/2007 | Gill | 360/324.1 |

OTHER PUBLICATIONS

U.S. Appl. No. 11/177,606, filed Jul. 8, 2005, Nibarger et al.
U.S. Appl. No. 11/017,170, filed Dec. 20, 2004, Watson et al.
Nakashio et al, "Flux Guide Type Tunnel-Valve Head for Tape Storage Applications", IEEE Transactions on Magnetics, vol. 38, No. 5, Sep. 2002, pp. 1925-1927.
Druyvesteyn et al., "Magnetoresistive Heads", IEEE Transactions on Magnetics, vol. MAG-17, No. 6, Nov. 1981, pp. 2884-2889.
Shimazawa et al., "Evaluation of Front Flux Guide-Type Magnetic Tunnel Junction Heads", IEEE Transactions on Magnetics, vol. 35, No. 5, Sep. 2000, pp. 2542-2544.
Folkerts et al., "Performance of Yoke Type GMR Heads", IEEE Transactions on Magnetics, vol. 31, No. 6, Nov. 1995, pp. 2591-2596.
Koshikawa et al., "Flux-Guided MR Head for Very Low Flying Height", IEEE Transactions on Magnetics, vol. 30, No. 6, Nov. 1994, pp. 3840-3842.
Tsang et al., "Study of Recessed MR Sensors with Unlaminated and Multi-Laminated Flux-Guides", IEEE Transactions on Magnetics, vol. 28, No. 5, Sep. 1992, pp. 2289-2291.
Druyvesteyn et al., "Thin-Film Read Head for Analog Audio Application", IEEE Transactions on Magnetics, vol. MAG-19, No. 5, Sep. 1983, pp. 1748-1750.

* cited by examiner

*Primary Examiner* — David D Davis
(74) *Attorney, Agent, or Firm* — Brooks Kushman P.C.

(57) ABSTRACT

A magnetic sensor including a first layer that is a pinned layer, the first layer having a first edge. The magnetic sensor includes a second layer that is a non-magnetic metal layer, the second layer having a second edge corresponding to the first edge. The second layer is adjacent the first layer. The magnetic sensor includes a third layer that is a free layer, the third layer having a third edge corresponding to the first edge and the second edge. The third layer is adjacent the second layer. The magnetic sensor also includes a fourth layer that is a flux guide layer. The fourth layer is adjacent the third layer. The fourth layer extends outwardly from the third layer relative to the first layer and the second layer.

5 Claims, 4 Drawing Sheets

CORROSION PROTECTION UTILIZING A MILLED, BOTTOM SPIN VALVE GMR SENSOR

BACKGROUND OF THE INVENTION

1. Field of the Invention

The present invention relates generally to magnetic sensors and particularly to corrosion protection in a bottom-pinned spin valve sensor.

2. Description of the Related Art

Corrosion in a metal, usually copper, layer of a magnetic read head can be a problem. Corrosion can reduce the effectiveness of magnetic read heads, or even cause a magnetic read head to fail. One method to address this problem is through the use of anisotropic magneto-resistive (AMR) sensors. However, the percentage change in sensor resistance ($\Delta R/R$) for an anisotropic magneto-resistive sensor is only about 2%. The percentage change in sensor resistance is a metric of total signal available from the sensor.

The sensor's $\Delta R/R$ can be increased using the giant magneto-resistance (GMR) effect. The $\Delta R/R$ for a giant magneto-resistance sensor is about 10% to about 20%. However, a major drawback associated with the giant magneto-resistance sensor is that the giant magneto-resistance sensor re-introduces the problem with corrosion.

SUMMARY OF THE INVENTION

A magnetic sensor including a first layer that is a pinned layer, the first layer having a first edge. The magnetic sensor includes a second layer that is a non-magnetic metal layer, the second layer having a second edge corresponding to the first edge. The second layer is adjacent the first layer. The magnetic sensor includes a third layer that is a free layer, the third layer having a third edge corresponding to the first edge and the second edge. The third layer is adjacent the second layer. The magnetic sensor also includes a fourth layer that is a flux guide layer. The fourth layer is adjacent the third layer. The fourth layer extends outwardly from the third layer relative to the first layer and the second layer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
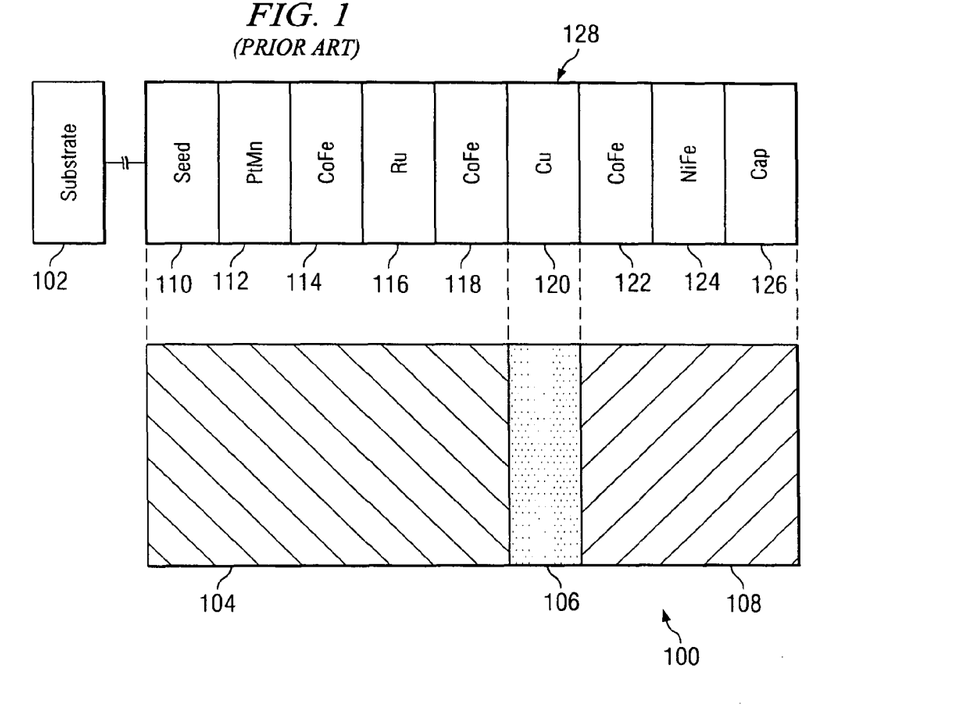
FIG. 1 shows a prior art giant magneto-resistive sensor, in which the invention can be implemented, in accordance with an illustrative example of the present invention.

FIG. 1 shows a prior art giant magneto-resistive sensor, in which the invention can be implemented. Giant magneto-resistive sensor 100 is a bottom spin valve magnetic sensor. Giant magneto-resistive sensor 100 includes a stack of layers, including substrate 102, pinned layer 104, non-magnetic metallic layer 106, and free layer 108.

Pinned layer 104 provides a reference magnetization and free layer 108 provides a rotatable magnetization. The magnetization of pinned layer 104 is fixed while the magnetization of free layer 108 rotates under the influence of an external magnetic field. In this example, the external magnetic field is the magnetic field of the magnetic media that is to be read by giant magneto-resistive sensor 100.

In giant magneto-resistive sensor 100, the change in electrical resistance in the sensor depends on the angular difference between the magnetizations of pinned layer 104 and free layer 108. The changes in resistance over time caused by the angular difference between the magnetizations of pinned layer 104 and free layer 108 can be measured. The angular difference between the magnetizations of pinned layer 104 and free layer 108 thereby is caused by the changing magnetic fields from the magnetic media. The measured changes in resistance can be converted into data usable by a data processing system.

Each of layers 104, 106, and 108 can include a number of sub-layers. For example, pinned layer 104 can include seed layer 110, antiferromagnet layer 112, first pinned layer 114, antiferromagnetic coupling layer 116, and reference layer 118. Together, first pinned layer 114, antiferromagnetic coupling layer 116, and pinned reference layer 118 can be referred-to as a synthetic antiferromagnet (SAF). The synthetic antiferromagnet is used to increase the pinning strength of reference layer 118.

Each of the sub-layers in pinned layer 104 can be made from a variety of materials. For example, seed layer 110 can include Ta (tantalum), NiFe (nickel iron), CoFe (cobalt iron), NiFeCr (nickel iron chromium), Ti (titanium), and CoFeB (cobalt iron boron). Antiferromagnet layer 112 can include PtMn (platinum manganese), other manganese based antiferromagnetic alloys, as well as insulators such as NiO (nickel oxide). First pinned layer 114 can include CoFe and other materials such as CoFeB, Co (cobalt), and NiFe. Antiferromagnetic coupling layer 116 can include materials such as Ru (ruthenium). Pinned reference layer 118 can include materials such as CoFe and other materials such as Co and CoFeB.

Each of these layers can be varied, and not all layers need be present to form pinned layer 104, though at a minimum pinned layer 104 includes a material such as CoFe in order to create a pinning magnetic field. Other appropriate materials can also be used for these layers.

In an illustrative example, non-magnetic metallic layer 106 includes a non-magnetic metal layer 120. Non-magnetic metallic layer 106 or 120 can be made of a non-magnetic metal, such as Cu (copper). Other non-magnetic metals can be used in place of non-magnetic metal layer 106 or 120, such as CuAg, CuAu, Ag, and Au. Non-magnetic metallic layer 106 acts as a spacer between pinned layer 104 and free layer 108. In other examples, non-magnetic metal layer 120 can include other layers of non-magnetic metals or other layers of non-magnetic materials. Other appropriate materials can also be used for these layers.

Free layer 108 can also include a number of sub-layers. In an illustrative example, free layer 108 includes free reference layer 122, magnetic layer 124, and cap layer 126. Each layer can be made of a variety of materials. For example, free reference layer 122 can include CoFe, CoFeB, and Co. Magnetic layer 124 can include NiFe, CoFeB, and Co. Cap layer serves as a cap to the entire sensor stack and can include materials such as Ta or Ti (titanium). Free reference layer 122 and magnetic layer 124 are films that are used to optimize the giant magnetoresistive effect using the CoFe layer while also obtaining better magnetic properties through the addition of the NiFe layer. Pinned layer 104 non-magnetic metallic layer 106, and free layer 108 form a stack that can be referred to as a bottom spin valve because the antiferromagnet is deposited before the free layer. Other appropriate materials can also be used for these layers.

Each layer in the stack has an edge that, in an illustrative example, is aligned along the same axis. Thus, giant magneto-resistive sensor 100 has edge 128 that typically abuts or is placed near a magnetic media, such as a magnetic tape. However, the methods and devices described herein can be implemented in both synthetic antiferromagnetic structures and single ferromagnetic films.

In an illustrative example, the relative thickness of the elements within each layer is Ta(50 Å)/Pt$_{49}$Mn$_{51}$ (200 Å)/Co$_{90}$Fe$_{10}$ (30 Å)/Ru(10 Å)/Co$_{90}$Fe$_{10}$ (32 Å) / Cu(25 Å)/Co$_{90}$Fe$_{10}$ (30 Å)/Ni$_{80}$Fe$_{20}$ (35 Å)/Ta(50 Å). However, the thickness of the elements within each layer can be varied, as can the elements, alloys, and compounds that make up giant magneto-resistive sensor 100. For example, antiferromagnet layer 112 can be made from elements, alloys, and compounds such as described above. Similarly, antiferromagnetic layer 112 can be made from various Mn based antiferromagnetic alloys, as well as insulators such as NiO. Similarly, the number of layers that make up giant magneto-resistive sensor 100 can also be varied such that more or fewer layers of the same or different substances are present.

Figure 3:
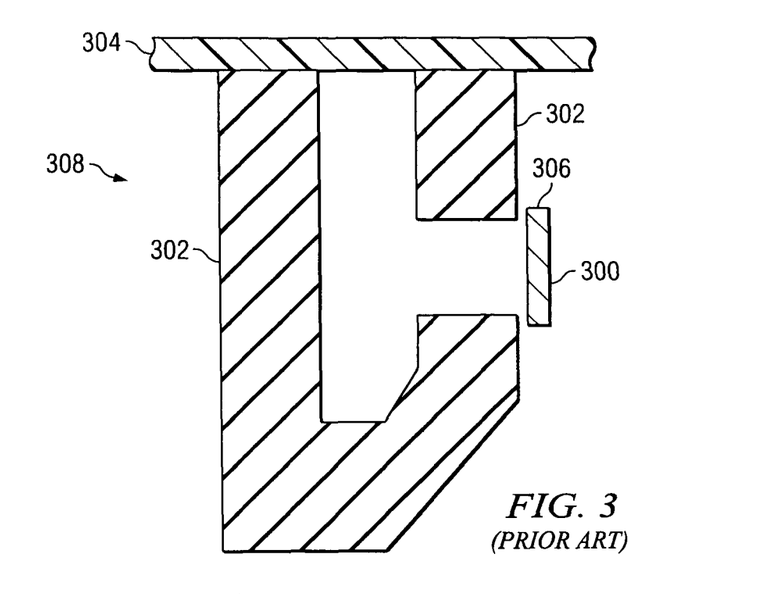
FIG. 3 shows a prior art yoke structure for a giant magneto-resistive sensor, in accordance with an illustrative example of the present invention.
Figure 4:
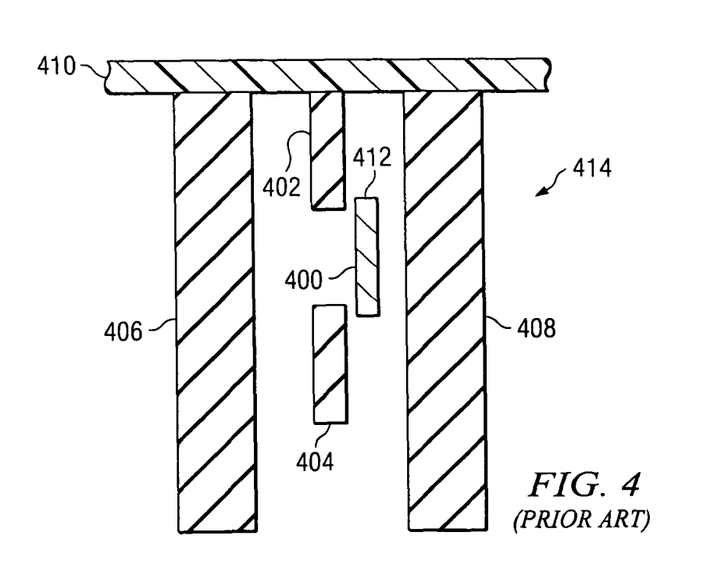
FIG. 4 shows a prior art flux guide structure for a giant magneto-resistive sensor, in accordance with an illustrative example of the present invention.

The layer most susceptible to corrosion is non-magnetic metal layer 120. However, non-magnetic metal layer 120 is also an important layer because non-magnetic metal layer 120 carries half of the current for the magnetic sensor. Furthermore, the spin dependent scattering of the giant magneto-resistive effect occurs mainly at the interface of non-magnetic metal layer 120 and pinned reference layer 118, as well as at the interface of non-magnetic metal layer 120 and free reference layer 122. Other materials that make up the sensor stack of magnetic sensor 100 may be susceptible to corrosion as well. Solutions to the problem of corrosion in non-magnetic metal layer 120 specifically, as well as in the remaining layers of magnetic sensor 100 have been proposed, as shown in FIG. 2 through FIG. 4.

Figure 2:
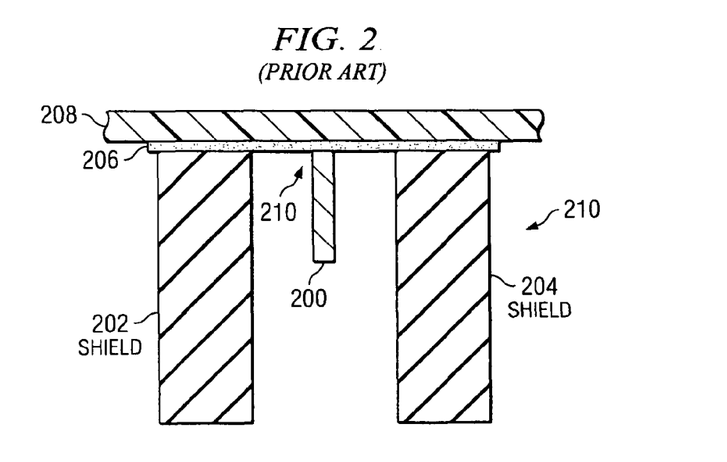
FIG. 2 shows a prior art giant magneto-resistive sensor placed between two shields, in accordance with an illustrative example of the present invention.

FIG. 2 shows a prior art giant magneto-resistive sensor placed between two shields. Giant magneto-resistive sensor 200 can be giant magneto-resistive sensor 100 shown in FIG. 1. Giant magneto-resistive sensor 200 is aligned such that edge 210 corresponds to edge 128 in FIG. 1. Thus, edge 210, or edge 128 of FIG. 1, abuts protective layer 206 and is near magnetic media 208. Shield 202 and shield 204 are provided to control the magnetic field and sensor resolution in the vicinity of giant magneto-resistive sensor 200. Together, giant magneto-resistive sensor 200, shield 202, and shield 204 form read head 210. FIG. 2 is an example of a prior art solution to corrosion in non-magnetic metal layer 120, specifically or the entire sensor stack 100 in FIG. 1.

Protective layer 206 acts as a physical barrier between magnetic media 208 and giant magneto-resistive sensor 200. In an illustrative example, magnetic media is a magnetic tape that moves parallel to edge 210 of giant magneto-resistive sensor 200 in the direction from one shield, 202 or 204, to the other shield, 204 or 202. Through friction, magnetic tape can physically erode giant magneto-resistive sensor 200, and specifically the non-magnetic metal layer within giant magneto-resistive sensor 200. If magnetic media 208 is some other form of magnetic media, such as a hard drive or some other magnetic media, then corrosion can still occur in non-magnetic metal layer 120 or the entire film stack of giant magneto-resistive sensor 200.

At least two problems exist with this solution. First, protective layer 206 can be worn off by friction between magnetic media 208 and protective layer 206. Second, protective layer 206 induces spacing loss in giant magneto-resistive sensor 200. The spacing loss can reduce the signal detected from magnetic media 208 to unacceptable levels. The reduction in signal reduces the ability of read head 210 to read data from magnetic media 208. Thus, the solution to corrosion in a giant magneto-resistive sensor shown in FIG. 2 is not desirable.

FIG. 3 shows a prior art yoke structure for a giant magneto-resistive sensor. Giant magneto-resistive sensor 300 can be giant magneto-resistive sensor 100 shown in FIG. 1. Giant magneto-resistive sensor 300 is aligned such that edge 306 corresponds to edge 128 in FIG. 1. Yoke structure 302 is, a shield that is provided to control the magnetic flux through giant magneto-resistive sensor 300. FIG. 3 is an example of a prior art solution to corrosion in non-magnetic metal layer 120 in FIG. 1.

In this configuration, giant magneto-resistive sensor 300 is buried within read head 308. Thus, giant magneto-resistive sensor 300 does not directly abut or touch magnetic media 304. Especially in the case that magnetic media 304 is a magnetic tape, this configuration largely prevents corrosion in the non-magnetic metal layer of giant magneto-resistive sensor 300.

However, the solution shown in FIG. 3 is also not desirable. The increased manufacturing complexity of yoke structure 302 increases the cost of read head 308. Furthermore, by moving giant magneto-resistive sensor 300 away from magnetic media 304, maximum efficiency of flux detection in giant magneto-resistive sensor 300 in read head 308 is only about 50%, and is generally in the range of about 20% to about 30%. This reduction in efficiency arises largely from increased magnetic reluctance in the read head. The yoke structure conducts the flux in a loop from the media 304, through yoke structure 302, through sensor 300, through yoke structure 302, and back to media 304. The reduction in efficiency reduces signal strength, and thereby reduces the ability of read head 308 to read data from magnetic media 304.

FIG. 4 shows a prior art flux guide structure for a giant magneto-resistive sensor. Giant magneto-resistive sensor 400 can be giant magneto-resistive sensor 100 shown in FIG. 1. Giant magneto-resistive sensor 400 is aligned such that edge 412 corresponds to edge 128 in FIG. 1. The flux guide structure is a number of shields that are provided to control the magnetic flux through giant magneto-resistive sensor 400. Together, shield 402, shield 404, shield 406, and shield 408 form the flux guide structure. FIG. 4 is an example of a prior art solution to corrosion in non-magnetic metal layer 120 in FIG. 1.

In this configuration, giant magneto-resistive sensor 400 is also buried within read head 414. Thus, giant magneto-resistive sensor 400 does not directly abut or touch magnetic media 410. Especially in the case that magnetic media 410 is a magnetic tape, this configuration largely prevents corrosion in the non-magnetic metal layer of giant magneto-resistive sensor 400.

However, the solution shown in FIG. 4 is also not desirable. Like yoke structure 302 in FIG. 3, the increased manufacturing complexity of the flux guide structure increases the cost of read head 414. Furthermore, by moving giant magneto-resistive sensor 400 away from magnetic media 410, maximum efficiency of flux detection in giant magneto-resistive sensor 400 in read head 414 is only about 50%, and is generally in the range of about 20% to about 30%. This reduction in efficiency arises largely from increased magnetic reluctance in the read head. In this case the flux from the media enters the sensor by first traveling through flux guide 402, then through the sensor entering at 412 and exiting at 400 to enter the flux guide 404. The problem is that while the flux is moving through these components, there is flux leakage to the shields. This flux leakage decreases the efficiency of the structure shown in FIG. 4. The reduction in efficiency reduces signal strength, and thereby reduces the ability of read head 414 to read data from magnetic media 410.

The solutions described with respect to FIG. 2 through FIG. 4 all have some undesirable aspects. Thus, what is needed is a method or device to protect the vulnerable non-magnetic metal layer without introducing additional spacing or signal losses between the magnetic media and the active layer of the giant magneto-resistive sensor.

We have proposed another solution to the problem of corrosion in the non-magnetic metal layer of a giant magneto-resistive sensor. First the non-magnetic metal layer, by itself, is etched back. Thus, referring back to FIG. 1, the edge of non-magnetic metal layer 120 no longer lies along the same axis as edge 128. Instead, the edge of non-magnetic metal layer 120 does not project as far as the edges of the remaining layers. The non-magnetic metal layer is protected through mechanical entrainment, electrolytic plating, electro-less plating, or via some other method. Finally, the giant magneto-resistive sensor is tape lapped to the appropriate pole tip recession. This process successfully addresses the problems described above.

An additional method for solving the problem of corrosion in the non-magnetic metal layer or other materials in the sensor stack of a bottom spin valve giant magneto-resistive sensor is shown with respect to FIG. 5 through FIG. 8. FIG. 5 through FIG. 8 show a process of forming a bottom spin valve giant magneto-resistive sensor that is resistant to corrosion in the non-magnetic metal layer or other materials in the sensor stack. A giant magneto-resistive sensor is referred-to as a bottom spin valve giant magneto-resistive sensor when the pinned layer and non-magnetic metal (typically Cu) layer are deposited below the free layer.

Figure 5:
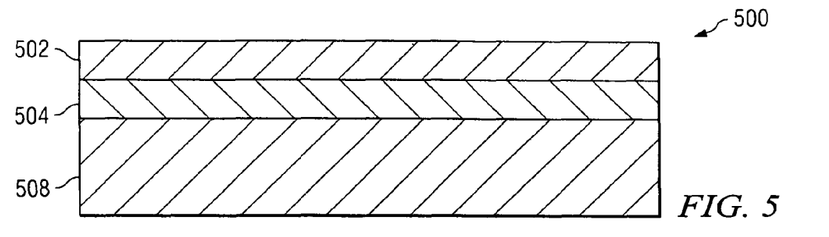
FIG. 5 shows a bottom spin valve giant magneto-resistive sensor film stack, in accordance with an illustrative example of the present invention.
Figure 6:
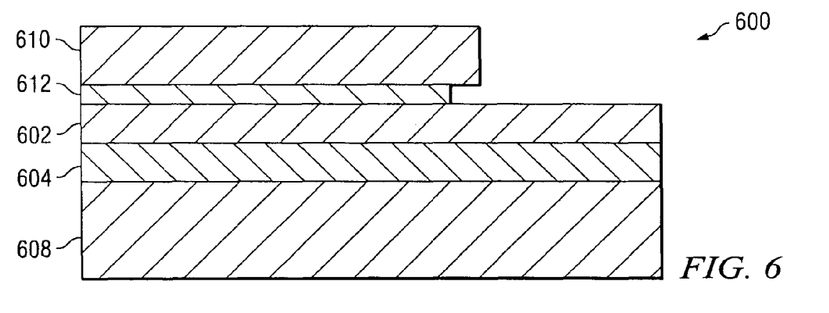
FIG. 6 shows part of a bottom spin valve giant magneto-resistive sensor film stack with a bi-layer photoresist, in accordance with an illustrative example of the present invention.
Figure 7:
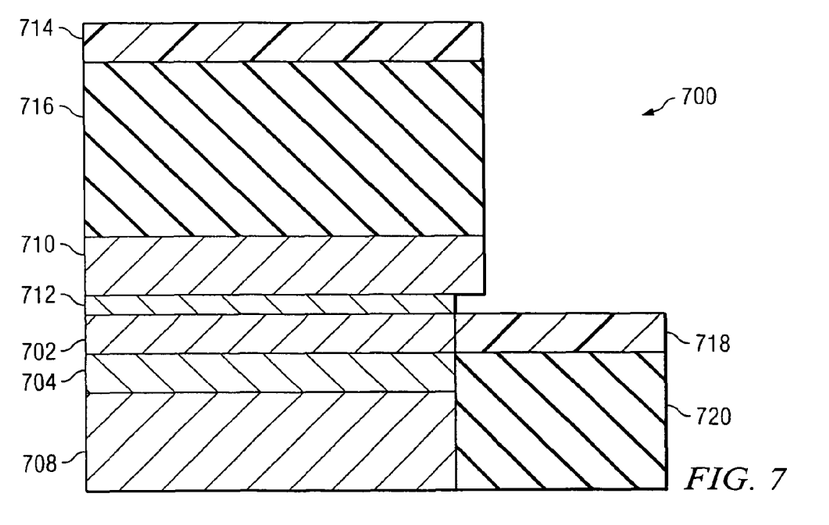
FIG. 7 shows part of a bottom spin valve giant magneto-resistive sensor film stack with a gap layer and flux guide layer, in accordance with an illustrative example of the present invention.
Figure 8:
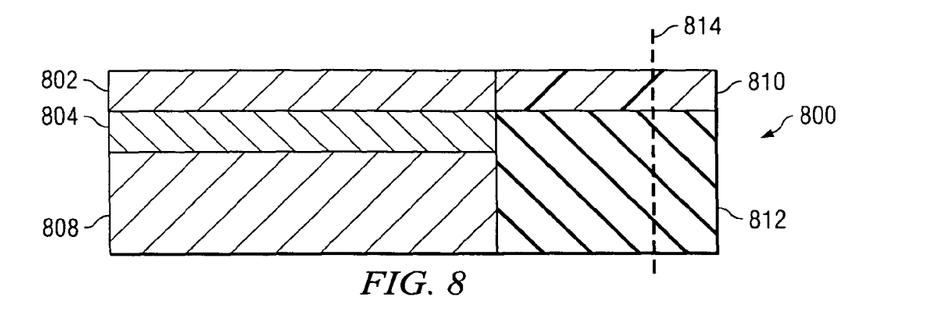
FIG. 8 shows part of a bottom spin valve giant magneto-resistive sensor film stack after photoresist lift-off, in accordance with an illustrative example of the present invention.

FIG. 5 through FIG. 8 show the steps involved in creating a bottom spin valve giant magneto-resistive sensor that is resistant to corrosion in the metal (typically Cu) layer. FIG. 5 shows an exemplary bottom spin valve giant magneto-resistive sensor, and each of FIG. 6 through FIG. 8 shows a step in the deposit and lift-off process shown. At the end of the process, the bottom spin valve giant magneto-resistive sensor show in FIG. 8, which is resistant to corrosion in the non-magnetic metal layer, is created.

FIG. 5 shows a bottom spin valve giant magneto-resistive sensor film stack, in accordance with an illustrative example of the present invention. Bottom spin valve giant magneto-resistive sensor 500 is similar to giant magneto-resistive sensor 100 shown in FIG. 1. FIG. 5 is a cross section of bottom spin valve giant magneto-resistive sensor 500, looking along the axis of the permanent magnet parallel to the tape bearing surface.

Bottom spin valve giant magneto-resistive sensor 500 has a number of layers, including in this illustrative example free layer 502, non-magnetic metal layer 504, and pinned layer 508. Each of layers 502, 504, and 508 are similar to corresponding layers in giant magneto-resistive sensor 100 shown in FIG. 1 in that the layers in bottom spin valve giant magneto-resistive sensor 500 are made of similar materials that can vary as described above. Thus, for example, non-magnetic metal layer 504 is typically Cu, but can also be Cu based alloys such as CuAg and CuAu as well as elemental Au or Ag. In addition, as shown in FIG. 1, more or fewer layers can be added to bottom spin valve giant magneto-resistive sensor 500. In this case, the procedures described below would be modified to accommodate the additional or fewer layers.

FIG. 6 shows part of a bottom spin valve giant magneto-resistive sensor film stack with a bi-layer photoresist, in accordance with an illustrative example of the present invention. Bottom spin valve giant magneto-resistive sensor 600 corresponds to bottom spin valve giant magneto-resistive sensor 500 shown in FIG. 5. As a first step in the manufacturing process, photoresist layer 610 and photoresist layer 612 are patterned onto the surface of antiferromagnet layer 602. Together, photoresist layer 610 and photo resist layer 612 can be characterized as a bi-layer photoresist pattern. In other illustrative examples, more or fewer photoresist layers can be used.

A photoresist is a film used in photolithography that temporarily holds the pattern of a circuit path, other element of a chip, or a film layer. When exposed to light, a photoresist hardens and is resistant to the acid bath that washes away unexposed areas of the chip. Other techniques using a photoresist layer can also be implemented, so long as a desired portion of bottom spin valve giant magneto-resistive sensor 600 is protected from the subsequent milling, etching, or removing processes.

In the next manufacturing step, a portion of photoresist layer 610 and a portion of photoresist layer 612 are removed. However, none of the original layers are removed during this process. In the illustrative example shown in FIG. 6, the edge of photoresist layer 612 does not align with the edge of photoresist layer 610 such that photoresist layer 610 extends outwardly relative to photoresist layer 612.

FIG. 7 shows part of a bottom spin valve giant magneto-resistive sensor film stack with a gap layer and flux guide layer, in accordance with an illustrative example of the present invention. Bottom spin valve giant magneto-resistive sensor 700 corresponds to bottom spin valve giant magneto-resistive sensor 500 shown in FIG. 5 and bottom spin valve giant magneto-resistive sensor 600 shown in FIG. 6. In the next manufacturing step, bottom spin valve giant magnetoresistive sensor 700 is milled, etched, or otherwise worn to the bottom gap. This process effectively reduces the length of bottom spin valve giant magneto-resistive sensor 700 along the long axis of bottom spin valve giant magneto-resistive sensor 700.

After removing this portion of bottom spin valve giant magneto-resistive sensor 700, gap layer 720 is added to bottom spin valve giant magneto-resistive sensor 700. Gap layer 720 can be made from a variety of materials, such as high resistivity and hard metals and insulators such as alumina and silicon nitride, though in an illustrative example gap layer 720 is made from alumina (a substance primarily made of $Al_2O_3$). Because of how bottom spin valve giant magneto-resistive sensor 700 is manufactured, gap layer 720 is applied across the entire original length of the bottom spin valve giant magneto-resistive sensor 700 along the long axis of bottom spin valve giant magneto-resistive sensor 700. Thus, gap layer 720 is deposited both to the side of non-magnetic metal layer 704 and pinned layer 708, and lies on top of photoresist layer 710 shown as layer 716. However, in other illustrative examples, gap layer 720 can be added only in the region in which free layer 702, non-magnetic metal layer 704, and pinned layer 708 were removed. In the illustrative example shown, gap layer 720 is about as thick as the combined thickness of non-magnetic metal layer 704 and pinned layer 708.

Thereafter, flux guide layer 718 is added to bottom spin valve giant magneto-resistive sensor 700. Flux guide layer 718 can be made from a variety of materials, such as magnetically soft, high permeability alloys such as CZM or CZT, though in an illustrative example flux guide layer 718 is made from Permalloy™ (an alloy of about 80 parts nickel and about 20 parts iron). Because of how bottom spin valve giant magneto-resistive sensor 700 is manufactured, flux guide layer 718 is applied across the entire original length of the bottom spin valve giant magneto-resistive sensor 700 along the long axis of bottom spin valve giant magneto-resistive sensor 700. Thus, flux guide layer 718 is deposited both on top of gap layer 720 and to the side of free layer 702, and lies on top of gap layer 716 and, shown as layer 714. However, in other illustrative examples, flux guide layer 718 can be added only in the region in which free layer 702, non-magnetic metal layer 704, and pinned layer 708 were removed.

In an illustrative example, flux guide layer 718 is about as thick as free layer 702. Thus, because gap layer 720 is about as thick as the combined thickness of non-magnetic metal layer 704, and pinned layer 708, part of flux guide layer 718 is adjacent free layer 702. In the example shown, part of flux guide layer 718 has first and second surfaces that lie along the same axes as the first and second surfaces of free layer 702. Thus, in effect, flux layer 718 effectively extends free layer 702 outwardly relative to the other layers of bottom spin valve giant magneto-resistive sensor 700. In use, magnetic flux can travel through flux guide layer 718 and into free layer 702.

FIG. 8 shows part of a bottom spin valve giant magneto-resistive sensor film stack after photoresist, lift-off, in accordance with an illustrative example of the present invention. Bottom spin valve giant magneto-resistive sensor 800 corresponds to bottom spin valve giant magneto-resistive sensor 500 shown in FIG. 5, bottom spin valve giant magneto-resistive sensor 600 shown in FIG. 6, and bottom spin valve giant magneto-resistive sensor 700 shown in FIG. 7. In the next manufacturing step, a lift-off procedure is performed to remove the portion of gap layer 716, flux guide layer 714, photoresist layer 710, and photoresist layer 712 that is above free layer 702. The lift-off procedure can be performed by milling, etching, or any other process for removing films from other films. Flux guide layer 718, which abuts free layer 702, and gap layer 720, which abuts layers 704, and 708, remains intact.

If necessary, after the structure shown in FIG. 8 is formed, a top gap is applied to bottom spin valve giant magneto-resistive sensor 800, followed by a top shield. In any case, after construction of bottom spin valve giant magneto-resistive sensor 800 is complete, the edge of bottom spin valve giant magneto-resistive sensor 800 shared by both flux layer 810 and gap layer 812 is lapped back by etching, milling, or some other removal process. In an illustrative example, flux layer 810 and gap layer 812 are lapped back to the position shown by phantom line 814. In this illustrative example, about 400 nanometers are lapped back from flux guide layer 810 and gap layer 812. The area to the left of phantom line 814, relative to the illustrative example shown in FIG. 8, will form a magnetic sensor.

Thus, the method shown in FIG. 5 through FIG. 8 show a process for manufacturing a corrosion-resistant magnetic sensor from a magnetic sensor that includes a number of steps. First, a photoresist layer is formed on the magnetic sensor, the magnetic sensor including a pinned layer, a non-magnetic metal layer, and a free layer. The photoresist layer does not extend across the entire surface of the magnetic sensor. Next, the pinned layer, the non-magnetic metal layer, and the free layer are removed in the portion of the magnetic sensor not covered by the photoresist layer. A gap layer is formed in the portion of the magnetic sensor not covered by the photoresist layer. Thereafter, a flux guide layer is formed in the portion of the magnetic sensor not covered by the photoresist layer. In the illustrative examples shown, the photoresist layer is removed.

The layers described with respect to FIG. 5 through FIG. 8 can be varied. For example, the photoresist layer can be a bi-layer photoresist layer having a first photoresist layer and a second photoresist layer. The first photoresist layer is disposed adjacent the free layer and the second photoresist layer is disposed adjacent the first photoresist layer and opposite the free layer. In another example, the second photoresist layer extends outwardly relative to the first photoresist layer and relative to the free layer, the non-magnetic metal layer and the pinned layer. In other illustrative examples, a single layer photoresist can be utilized. In yet other examples, the non-magnetic metal layer can be copper, and the other layers can be formed from different materials, as described above.

Other processes can also be performed, such as, for example, to add at least one shield to form a read head. Additionally, the gap layer and the flux guide layer can be lapped back. In an illustrative example, the gap layer and the flux guide layer extend outwardly of the remaining layers about less than 400 nanometers.

If desirable, additional gap layers can be deposited on top of free layer 802 and flux guide layer 810 in order to provide a smooth surface upon which the shield or shields can be deposited. As a practical matter, the forming of such additional gap layers could occur either before or after the permanent magnets of the magnetic sensor are formed, depending on the exact method selected.

The method described with respect to FIG. 5 through FIG. 8 can be varied, so long as the final magnetic sensor has a flux guide layer that projects outwardly relative to the free layer of the magnetic sensor. For example, more or fewer layers can be added during the processes shown in FIG. 5 through FIG. 8. Additionally, additional steps can be taken or fewer steps can be taken, so long as the final magnetic sensor has a flux guide layer that projects outwardly relative to the free layer of the magnetic sensor. The various layers can also be formed from a variety of substances, as described above.

In an illustrative example, a magnetic sensor includes a first layer that is a pinned layer, the first layer having a first edge. The magnetic sensor includes a second layer that is a non-magnetic metal layer, the second layer having a second edge corresponding to the first edge. The second layer is adjacent the first layer. The magnetic sensor includes a third layer that is a free layer, the third layer having a third edge corresponding to the first edge and the second edge. The third layer is adjacent the second layer. The magnetic sensor also includes a fourth layer that is a flux guide layer, the fourth layer is adjacent the third layer. The fourth layer extends outwardly from the third layer relative to the first layer and the second layer.

Figure 9:
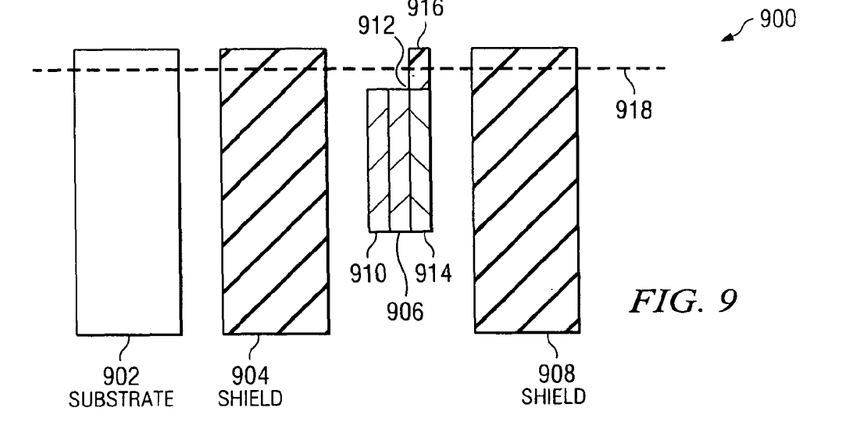
FIG. 9 shows a bottom spin valve giant magnetoresistive sensor head in use, in accordance with an illustrative example of the present invention.

FIG. 9 shows a giant magnetoresistive sensor head in use, in accordance with an illustrative example of the present invention. Giant magnetoresistive sensor head 900 is similar to giant magnetoresistive sensor head 100 shown in FIG. 1, as modified by the method shown in FIG. 5 through FIG. 8. Thus, giant magnetoresistive sensor head 900 includes substrate 902, first shield 904, magnetic sensor 906, and second shield 908. Magnetic sensor 906 includes a number of layers, including pinned layer 910, non-magnetic metal layer 912, free layer 914, and flux layer 916. Pinned layer 910 corresponds to pinned layer 808 in FIG. 8, non-magnetic layer 912 corresponds to non-magnetic metal layer 804 in FIG. 8, free layer 914 corresponds to free layer 802 in FIG. 8, and flux layer 916 corresponds to flux layer 810 shown in FIG. 8. Gap layer 812 shown in FIG. 8 is omitted in FIG. 9 for clarity. Magnetic sensor 906 is lapped back to phantom line 918, which corresponds to phantom line 814 in FIG. 8. Because non-magnetic metal layer 912 is physically separated from the head/tape interface, as shown in FIG. 9, non-magnetic metal layer 912 (which can be Cu) experiences much less wear and corrosion during use.

Figure 10:
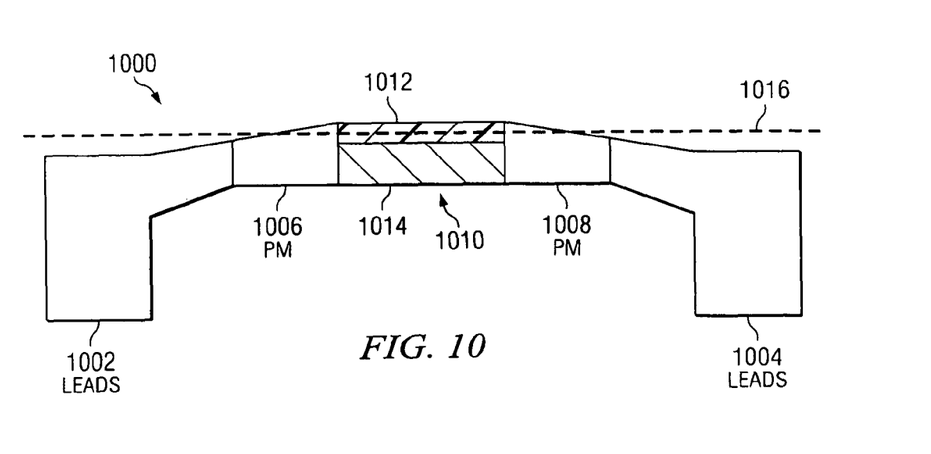
FIG. 10 shows a bottom spin valve giant magnetoresistive sensor head in use, in accordance with an illustrative example of the present invention.

FIG. 10 shows a giant magnetoresistive sensor head in use, in accordance with an illustrative example of the present invention. Giant magnetoresistive sensor head 1000 shown in FIG. 10 is a top view of giant magnetoresistive sensor head 900 shown in FIG. 9, with phantom line 1016 corresponding to phantom line 918 in FIG. 9.

Giant magnetoresistive sensor head 1000 includes lead 1002 and lead 1004 which serve as electrical leads for giant magnetoresistive sensor head 1000. Similarly, permanent magnet 1006 and permanent magnet 1008 are a part of giant magnetoresistive sensor head 1000. Magnetic sensor 1010 corresponds to magnetic sensor 906 in FIG. 9, as seen from a top view. Thus, tape 900 lies just above the page as one views FIG. 10 and the head/tape interface is at the level of the page. Similarly, flux guide layer 1012 corresponds to flux guide layer 916 in FIG. 9 and surface 1014 corresponds to the surfaces of layer 914 in FIG. 9.

In an illustrative example, the edges of the layers of the giant magnetoresistive sensor are about parallel to each other. The term "about parallel" edges means that the edges in question are parallel or approximately parallel to a common axis. However, the angle from the common axis can vary somewhat and still be about parallel. In other illustrative examples, the edges need not be about parallel to each other. Similarly, the term "about perpendicular" means that the edges in question are perpendicular or approximately perpendicular to a common axis, usually the long axis of a layer. However, the angle from the common axis can vary somewhat and still be about, perpendicular.

The aspects of the present invention have several advantages over known corrosion-resistant magnetic sensors. For example, the non-magnetic metal layer is removed from the magnetic sensor/magnetic media interface, thereby reducing corrosion in the non-magnetic metal layer. In addition, the flux guide layer allows magnetic flux at the magnetic sensor/magnetic media interface to flow into the free layer. Thus, no additional spacing losses occur. The efficiency of the magnetic sensor described herein can be very high, greater than 50%, due to the short distance between the magnetic sensor/magnetic media interface and the free layer of the magnetic sensor. Furthermore, the flux guide layer remains at the magnetic sensor/magnetic media interface, so no additional spacing losses are incurred. Furthermore, the free layer remains continuous such that optimum magnetic performance can be achieved. Additionally, the magnetic sensor described herein is compatible with most older magnetic media; thus, the magnetic sensor described herein can be used with both legacy magnetic storage systems, current magnetic storage systems, and future magnetic storage systems. Thus, the aspects of the present invention provide for a magnetic sensor that is both corrosion resistant and not subject to the same degradation in sensitivity seen in previous corrosion-resistant magnetic sensors.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A magnetic sensor, including a plurality of layers, the layers being adjacent to one another along a first axis, and the layers having terminating ends along a second axis, perpendicular to the first axis, wherein a first terminating end of each layer along the second axis forms a sensing end, operable to read a magnetically readable storage material, the sensor comprising:
   a first layer comprising a pinned layer;
   a second layer comprising a non-magnetic metal layer and adjacent to the first layer;
   a third layer comprising a free layer and adjacent to the second layer; and
   a fourth layer comprising a flux guide layer and adjacent to the third layer, without spacing therebetween, along the second axis, wherein the fourth layer extends outwardly from the first terminating end of the third layer along the second axis.

2. The magnetic sensor of claim 1 further comprising:
   a fifth layer comprising a gap layer, wherein the fifth layer is adjacent to the first layer and the second layer along the second axis, wherein the fifth layer extends outwardly from the terminating ends of the first layer and the second layer along the second axis, and wherein the fifth layer is also adjacent to the fourth layer along the first axis.

3. The magnetic sensor of claim 2 wherein the first terminating edges of the first layer, the second layer, and the third layer share a first plane, wherein the fourth layer has a second terminating edge, opposite the first terminating edge of the fourth layer along the second axis and sharing the first plane.

4. The magnetic sensor of claim 1 wherein the second layer comprises Cu.

5. The magnetic sensor of claim 1 further comprising:
at least one magnetic shield disposed relative to the first layer, the second layer, the third layer and the fourth layer along the second axis such that a read head is formed.

* * * * *

UNITED STATES PATENT AND TRADEMARK OFFICE
CERTIFICATE OF CORRECTION

| | |
|---|---|
| PATENT NO. | : 8,922,955 B1 |
| APPLICATION NO. | : 11/447622 |
| DATED | : December 30, 2014 |
| INVENTOR(S) | : Nibarger et al. |

It is certified that error appears in the above-identified patent and that said Letters Patent is hereby corrected as shown below:

In the Specification

In column 2, line 56, delete "layer." and insert -- layer --, therefor.

In column 3, line 42, delete "(32 Å) /" and insert -- (32 Å)/ --, therefor.

In column 7, line 56, delete "photoresist," and insert -- photoresist --, therefor.

In column 9, line 65, delete "about," and insert -- about --, therefor.

Signed and Sealed this
First Day of September, 2015

Michelle K. Lee
*Director of the United States Patent and Trademark Office*